(No Model.)
A. H. HOYT.
GALVANOMETER.
No. 532,560. Patented Jan. 15, 1895.
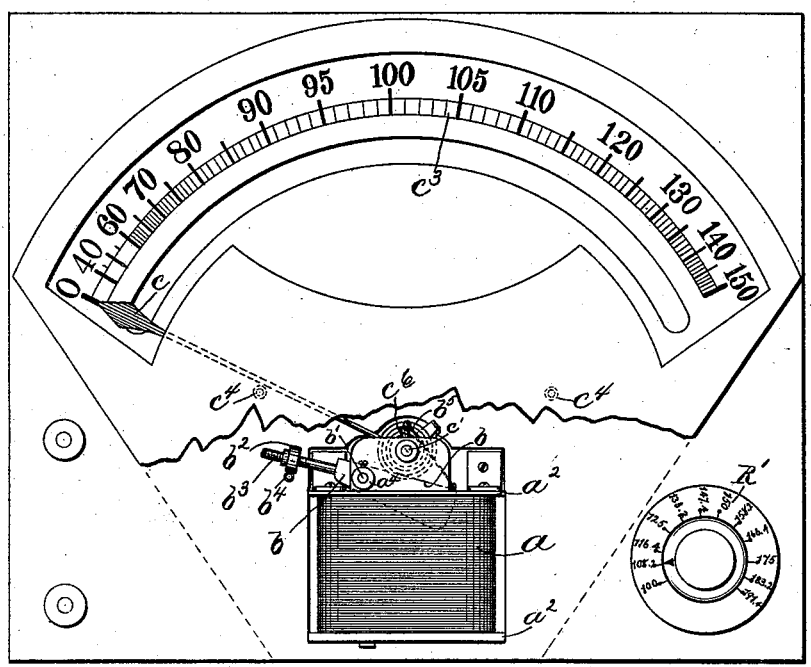
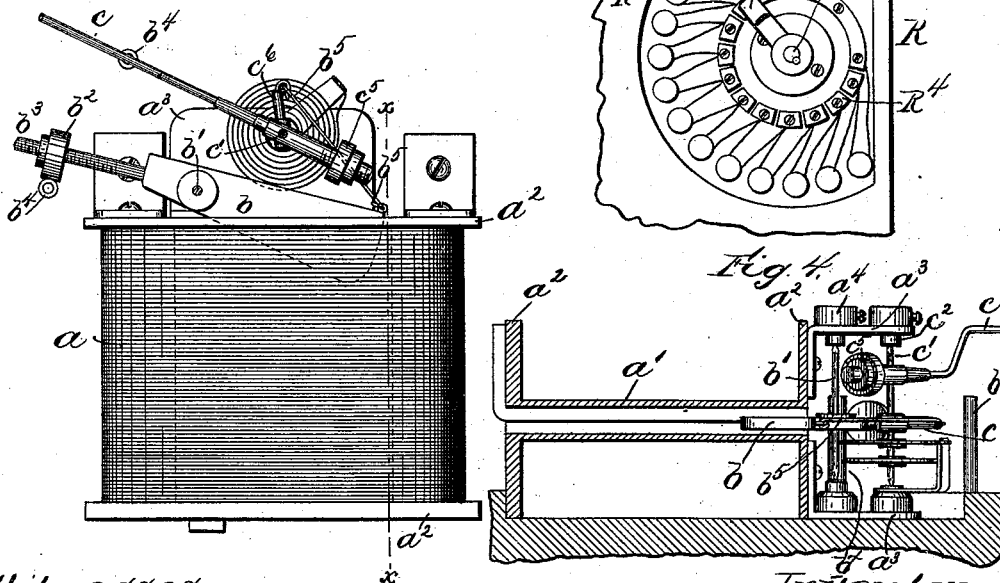
Witnesses
Jas. J. Maloney.
J. J. Livermore
Inventor.
Adrian H. Hoyt.
by Jos. P. Livermore
Atty.

UNITED STATES PATENT OFFICE.

ADRIAN H. HOYT, OF PENACOOK, NEW HAMPSHIRE, ASSIGNOR TO THE WHITNEY ELECTRICAL INSTRUMENT COMPANY, OF SACO, MAINE, AND MANCHESTER, NEW HAMPSHIRE.

GALVANOMETER.

SPECIFICATION forming part of Letters Patent No. 532,560, dated January 15, 1895.

Application filed April 25, 1894. Serial No. 508,931. (No model.)

*To all whom it may concern:*

Be it known that I, ADRIAN H. HOYT, of Penacook, county of Merrimac, State of New Hampshire, have invented an Improvement in Galvanometers, of which the following description, in connection with the accompanying drawings, is a specification, like letters on the drawings representing like parts.

My invention relates to electrical indicating instruments, such as galvanometers, and particularly that class of instruments known in the art as potential indicators or voltmeters, although the invention is also applicable to any instrument for indicating the voltage or amperage of an electric current flowing in any circuit at a given moment.

The device herein set forth is designed for use with alternating currents, although substantially the same instrument might be used on circuits carrying direct currents, the difference being merely a matter of calibration.

In a prior patent, No. 497,449, granted to me May 16, 1893, I have shown and described an indicating instrument which may be employed in carrying out the present invention, said invention consisting in certain improvements applicable to the instrument shown in said former patent among others. I have therefore shown in the appended drawings forming part of this specification a device the main portion of which is substantially the same as that shown in said prior Patent No. 497,449, but I do not wish to be understood as limiting my present invention to an instrument of exactly this description, since the novel features thereof might be applied to various instruments in which the movement of an armature or needle under the inductive influence of an electric current is used to indicate the quantity or potential thereof.

In carrying out my invention I prefer to employ a coil or solenoid of insulated wire of sufficiently high conductivity to carry electric currents of the character for which the instrument is designed, and a movable core piece or armature in inductive proximity thereto, so that the current flowing in the coil will cause the said armature to move, the extent of said movement in opposition to an opposing force indicating the amount of the current. In order that the amount of current thus indicated may be observed, I employ a pointer actuated by said armature, and a scale upon the face of the instrument traversed by the said pointer as is usual in instruments of this description. In calibrating the scale, however, it is found that the increments of movement of the armature are not directly proportional to the increments of current-strength; that is to say, as the amount of the current increases the movement of the armature becomes relatively greater until it reaches a certain position in the field, after which it becomes relatively less, thus necessitating unequal graduations on the scale, when a constantly increasing opposing force is employed. For example, in an instrument having a range from 0 where no current is indicated, to 150, indicating a current of one hundred and fifty volts, the graduations are exceedingly small at the beginning of the scale, increasing as they approach the middle and again decreasing toward the end.

My present invention embodies certain improvements in the arrangement of the instrument, whereby this variable ratio between the increments of current-strength and armature movement may to a certain extent be compensated for, and the graduations on the scale made more nearly uniform. I have found that this may be accomplished to some extent by confining the movement of the armature within certain limits, that is to say, rendering it movable only through that portion of its path in which its increments of movement vary the least with relation to the increments of current-strength. In order to avoid unnecessarily enlarging the instrument as would be necessary to obtain a legible scale if the pointer were directly connected to the armature under these conditions, I mount the indicator or pointer independently, and employ a multiplying connection between the two, such connection being also so arranged as to have a mechanical compensating effect at the pointer for the variation in increments not wholly obviated by the decreased movement of the armature, as will be shown hereinafter.

In the accompanying drawings, Figure 1 is a plan view of the instrument. Figs. 2 and 3 are details the former being somewhat enlarged, and Fig. 4 is a cross-section of Fig. 2, on the line $x$, $x$, looking from the right.

Referring to Figs. 1 and 2, the coil $a$ is wound upon a hollow or tubular supporting shell $a'$ preferably flattened in cross-section so as to form a narrow opening within the coil, as best shown in Fig. 4. The said shell is provided with flanges $a^2$ adapted to retain the coil in place, and also forming a support for brackets $a^3$ between which are pivotally supported the armature $b$ and the pointer $c$ upon spindles $b'$ and $c'$ respectively, arranged parallel to each other. A rheostat R in series with the coil $a$ (the circuit connections not being shown) provided with a calibrated scale R' is placed in any convenient part of the instrument, the operation of which will be hereinafter more fully described. The movable member or armature $b$ of the device consists of a flat, fan-shaped piece of metal such as soft-iron capable of being magnetized or demagnetized by the inductive effect of a current of electricity in proximity thereto. The said armature is mounted near one end on a spindle $b'$ supported in bearings $a^4$ upon the brackets $a^3$ and the said bearings are so situated with relation to the coil that substantially the entire armature extends outward therefrom over the narrow opening thereof, its lower half normally extending downward into said opening, thus being under the influence of the magnetic field developed by a current flowing through the coil. I further provide an arm $b^3$ extending outwardly in line with the armature beyond its pivotal bearing, and a counterpoise $b^2$ carried upon said arm and preferably adjustable with relation thereto, the object of said counterpoise being to balance the weight of the armature.

Suitable stops $b^4$ (Figs. 2 and 4) secured to the base of the instrument in the path of the arm $b^3$ limit the movement of the armature, said stops being so situated that the armature moves in that portion of the field where the increments of current-strength are most nearly related to the increments of movement of a body inductively influenced thereby.

A pointer $c$ mounted on a spindle $c'$ pivoted in bearings at $c^2$ upon the same brackets $a^3$ which support the armature bearings $a^4$ is arranged to move over the scale $c^3$ between the stops $c^4$ (Fig. 1). The said pointer is provided with a counterpoise $c^5$ best shown in Fig. 2, whereby it is balanced in its bearings. The said pointer is connected to the armature by means of a link $b^5$, which may be a wire or thread fastened to the armature near the free end thereof, said link extending to an arm or projection $c^6$ radial to the spindle $c'$ and suitably fastened thereto or integral therewith. As the armature moves into the magnetic field under the influence of the current, its movement is communicated through the link $b^5$ to the arm $c^6$ thus turning the spindle $c'$ in its bearings to the right and carrying the pointer over the scale. The pointer $c$ thus forms the long arm of a lever of which the bearings $c^2$ form the fulcrum, while the short arm is the perpendicular distance between the said link $b^5$ and the spindle $c'$. As the link moves the arm $c^6$ to the right, it obviously recedes from the axis thereof, thereby lengthening the short arm of the lever and decreasing the distance traveled by the long arm or pointer with relation to that of the armature, and the instrument is so adjusted that this compensating effect acts to correct the unequal movement of the pointer which would result from a direct connection with the armature. I am thus enabled to bring the graduations to an approximate equality, rendering the scale legible throughout its entire length, and the multiplying device admits of a comparatively short indicator moving in a comparatively long arc, thus materially reducing the size of the instrument.

It is to be understood, of course, that the link $b^5$ might be connected to the pointer itself on either side of its arbor, but in this case the pointer in its initial position would extend outward from its arbor in the direction of the arm $c^6$ necessitating a removal of the scale. By the use of the said arm $c^6$ the pointer can be given any desired position relative to its axis, so that the scale may be placed in the position most convenient for it.

The device as thus far described may be used on circuits carrying either a direct current or an alternating current, since the armature $b$ is normally non-polarized and capable of changing its polarity when influenced by the magnetic field, as the direction of the current changes. It is found however, that when an alternating current flows through the coil $a$ the movement of the armature with relation to the amount of current varies according to the periodicity of the current, since the self-induction increases as the periodicity becomes higher. In order to compensate for this change of relation I have provided means for putting more or less resistance into the circuit for currents of different periodicity. To this end, I employ a rheostat R shown diagrammatically in Fig. 3, the movable member of the said rheostat being provided with actuating means and a pointer traveling on a scale R', showing the condition of the rheostat. The scale R', is calibrated to show the position in which the movable member of the rheostat is to be placed for currents of different periodicity. The said rheostat may be constructed in any suitable manner, and I have shown it as comprising a movable member, consisting of a contact $R^2$, carried by and radial to an arbor $R^3$, having a knob or handle attached thereto for turning the said arm to various positions. A series of contacts $R^4$, connected together through resistance coils $R^5$, is arranged in the path of the said movable arm so that as the said arm is turned, more or less resistance is included in the circuit, the arm being connected to one end of the circuit, while the last terminal in the path of said arm is connected with the other side of the circuit. By this means the same instrument may be used to indicate or measure alternating currents of various periodicity, thus obviating the necessity of using a separate instrument especially calibrated in each case.

I do not intend to limit myself to the exact form of connecting link described herein, since any connection in the nature of a link acting upon a portion of the pointer such that the leverage increases with the forward movement of the pointer, might be used. The said link instead of being a wire or rod loosely or pivotally connected with the armature and pointer respectively, might be a flexible connection as it is subjected to tensile strain only, and the arm or arms with which it is connected might have a cam surface to produce the compensating effect. I prefer, however, to use the wire link shown since it is durable, simple, and effectual for the purpose desired.

I claim—

1. In an electrical indicating device, the combination with a solenoid, and an armature pivoted at one side of the end of said coil and extending outward from its pivot over the mouth of said coil and within the magnetic field thereof, of an indicator or pointer actuated by said armature and a compensating connection between the free end of said armature and the said pointer, as set forth.

2. The combination of the electrically moved armature or needle of an electrical indicating device, and a pivotally supported pointer or indicator, with a link connected at one end to said electrically moved armature and at the other end to an arm connected to said pointer, as set forth.

3. In an electrical indicating device, the combination with a solenoid and movable armature in inductive proximity thereto, of a rheostat in circuit with said solenoid and a pointer connected with said rheostat movable over a scale calibrated in terms of current periodicity, as and for the purpose set forth.

In testimony whereof I have signed my name to this specification in the presence of two subscribing witnesses.

ADRIAN H. HOYT.

Witnesses:
J. ALBERT MASSIE,
HORACE D. BEAN.